(12) United States Patent
Saito

(10) Patent No.: US 10,539,422 B2
(45) Date of Patent: Jan. 21, 2020

(54) COMPUTER-READABLE RECORDING MEDIUM, EVALUATION METHOD, AND EVALUATION DEVICE

(71) Applicant: FUJITSU LIMITED, Kawasaki-shi, Kanagawa (JP)

(72) Inventor: Takahiro Saito, Asaka (JP)

(73) Assignee: FUJITSU LIMITED, Kawasaki (JP)

( * ) Notice: Subject to any disclaimer, the term of this patent is extended or adjusted under 35 U.S.C. 154(b) by 117 days.

(21) Appl. No.: 15/415,240

(22) Filed: Jan. 25, 2017

(65) Prior Publication Data
US 2017/0284807 A1 Oct. 5, 2017

(30) Foreign Application Priority Data
Mar. 31, 2016 (JP) ................. 2016-073316

(51) Int. Cl.
*G01C 21/20* (2006.01)
*B63B 49/00* (2006.01)
*G01S 13/93* (2006.01)
*G08G 3/00* (2006.01)

(52) U.S. Cl.
CPC ............ *G01C 21/203* (2013.01); *B63B 49/00* (2013.01); *G01S 13/9307* (2013.01); *G08G 3/00* (2013.01)

(58) Field of Classification Search
CPC ....... G01C 21/203; B63B 49/00; B63B 43/00; G01S 13/9307; G08G 3/00; G08G 3/02

USPC .......................................... 701/301
See application file for complete search history.

(56) References Cited

U.S. PATENT DOCUMENTS

| 8,612,129 | B2 * | 12/2013 | Gagliardi | G08G 3/02 701/300 |
| 2011/0022316 | A1 * | 1/2011 | Bendito Vallori | B63H 21/22 701/301 |
| 2011/0210865 | A1 * | 9/2011 | Lee | G08G 3/02 340/903 |
| 2013/0238232 | A1 * | 9/2013 | Choi | G08G 3/02 701/301 |
| 2018/0190129 | A1 * | 7/2018 | Park | B63B 49/00 |

FOREIGN PATENT DOCUMENTS

| JP | 10-250681 | 9/1998 |
| JP | 2004-178258 | 6/2004 |

* cited by examiner

*Primary Examiner* — Krishnan Ramesh

(57) ABSTRACT

A non-transitory computer-readable recording medium stores a program that causes a computer to execute a process. The process includes extracting a sailing log of a ship in a sea area with a sailing route existing therein, the sea area being such that a distance between two ships of the ship and another ship is less than a predetermined value and at least one of the two ships has a ship track deviating from the sailing route; and evaluating risks at a plurality of points that are included in the sea area, based on the extracted sailing log.

7 Claims, 14 Drawing Sheets

COMPUTER-READABLE RECORDING MEDIUM, EVALUATION METHOD, AND EVALUATION DEVICE

CROSS-REFERENCE TO RELATED APPLICATIONS

This application is based upon and claims the benefit of priority of the prior Japanese Patent Application No. 2016-073316, filed on Mar. 31, 2016, the entire contents of which are incorporated herein by reference.

FIELD

The embodiments discussed herein are related to a computer-readable recording medium, an evaluation method, and an evaluation device.

BACKGROUND

On sailing of a ship, a dangerous place exists where a collision accident or accident avoidance behavior is found more frequently than another area. Accordingly, a technique exists for executing risk determination for sailing of ships based on a relative distance between the ships.

Japanese Laid-open Patent Publication No. 2014-178258
Japanese Laid-open Patent Publication No. 10-250681

However, even though risk determination for sailing of ships is executed based on a relative distance between the ships, it may be impossible to detect a dangerous place with a high risk of collision accurately. For example, sailing in a harbor includes both entry into a harbor facility and continued sailing on a sailing route in a harbor. Accordingly, in risk determination based on a relative distance between ships, a course change for entry into a wharf as a destination from a sailing route may be erroneously detected as avoidance behavior.

SUMMARY

According to an aspect of an embodiment, a non-transitory computer-readable recording medium stores a program that causes a computer to execute a process. the process includes extracting a sailing log of a ship in a sea area with a sailing route existing therein, the sea area being such that a distance between two ships of the ship and another ship is less than a predetermined value and at least one of the two ships has a ship track deviating from the sailing route; and evaluating risks at a plurality of points that are included in the sea area, based on the extracted sailing log.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. This invention is not limited by these embodiments. It is possible to combine respective embodiments appropriately as long as process contents thereof are consistent with one another. Hereinafter, a case where the invention is applied to a support system that supports sailing of a ship will be described as an example.

System Configuration

Figure 1:
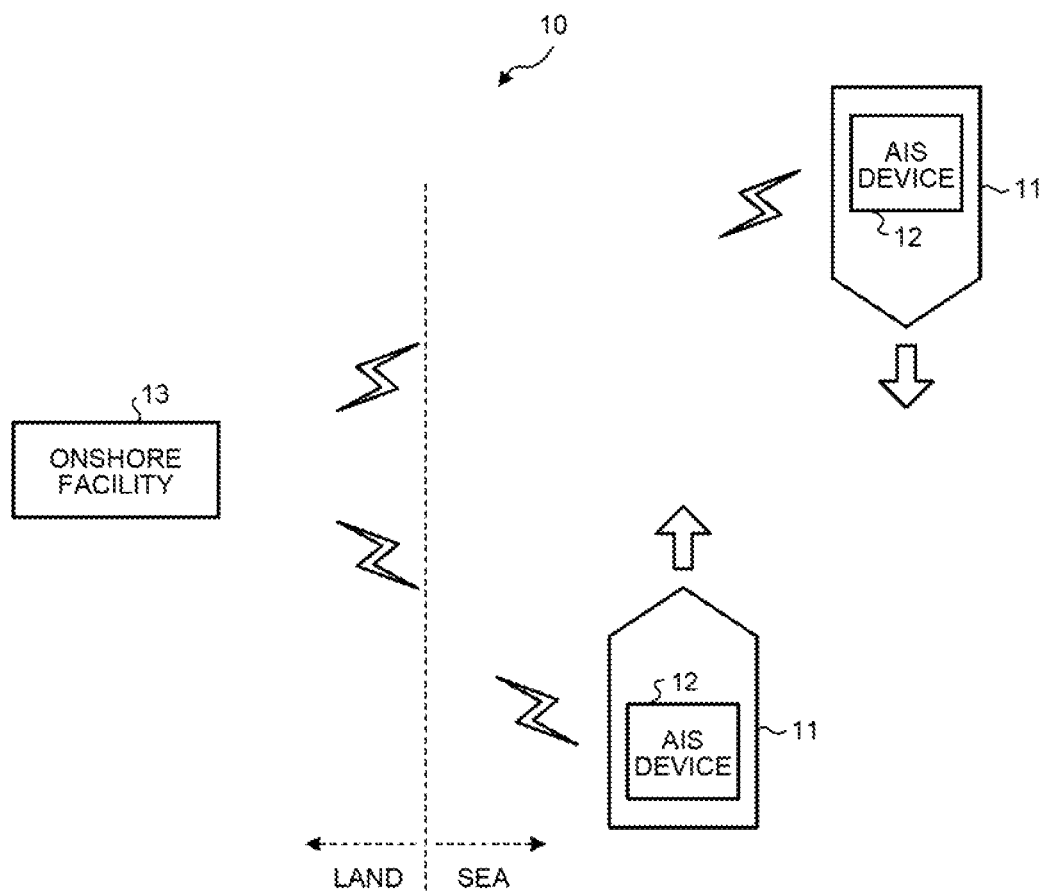
FIG. 1 is a diagram illustrating an example of a general configuration of a support system.

First, an example of a support system 10 according to a first embodiment will be described. FIG. 1 is a diagram illustrating an example of a general configuration of a support system. The support system 10 is a system that supports sailing of a ship.

FIG. 1 illustrates two ships 11 and an onshore facility 13. The ship 11 is mounted with an AIS device 12. For example, a particular ship is obligated to mount the AIS device 12 according to a law or the like. Such a particular ship corresponds to any ship of 300 gross tons or more that engages in an international voyage, any passenger ship that engages in an international voyage, or any ship of 500 gross tons or more that does not engage in an international voyage. The AIS device 12 may also be mounted on a ship other than such a particular ship.

The AIS device 12 periodically transmits AIS information that includes a variety of information on the ship 11 mounted therewith through wireless communication. AIS information includes, for example, information such as a position represented by latitude and longitude, a ship name, a point of time, a direction of a bow of the ship 11, an identification code of the ship 11 such as a Maritime Mobile Service Identity (MMSI) number, or a length or a width of the ship 11. AIS information is receivable by the other ship 11 or the onshore facility 13. The other ship 11 or the onshore facility 13 can catch a variety of information such as a position of the ship 11, a ship name, a point of time, a direction of a bow of the ship 11, an identification code of the ship 11, or a length or a width of the ship 11, based on received AIS information.

The onshore facility 13 is, for example, a facility that executes control of sailing of each ship 11, such as a vessel traffic service center or a port traffic control office in the Japan Coast Guard. The onshore facility 13 catches a position of each ship 11 based on AIS information received from each ship 11, information detected by a radar, or the like, and provides a variety of information on sea traffic to each ship 11.

Configuration of Evaluation Device

Figure 2:
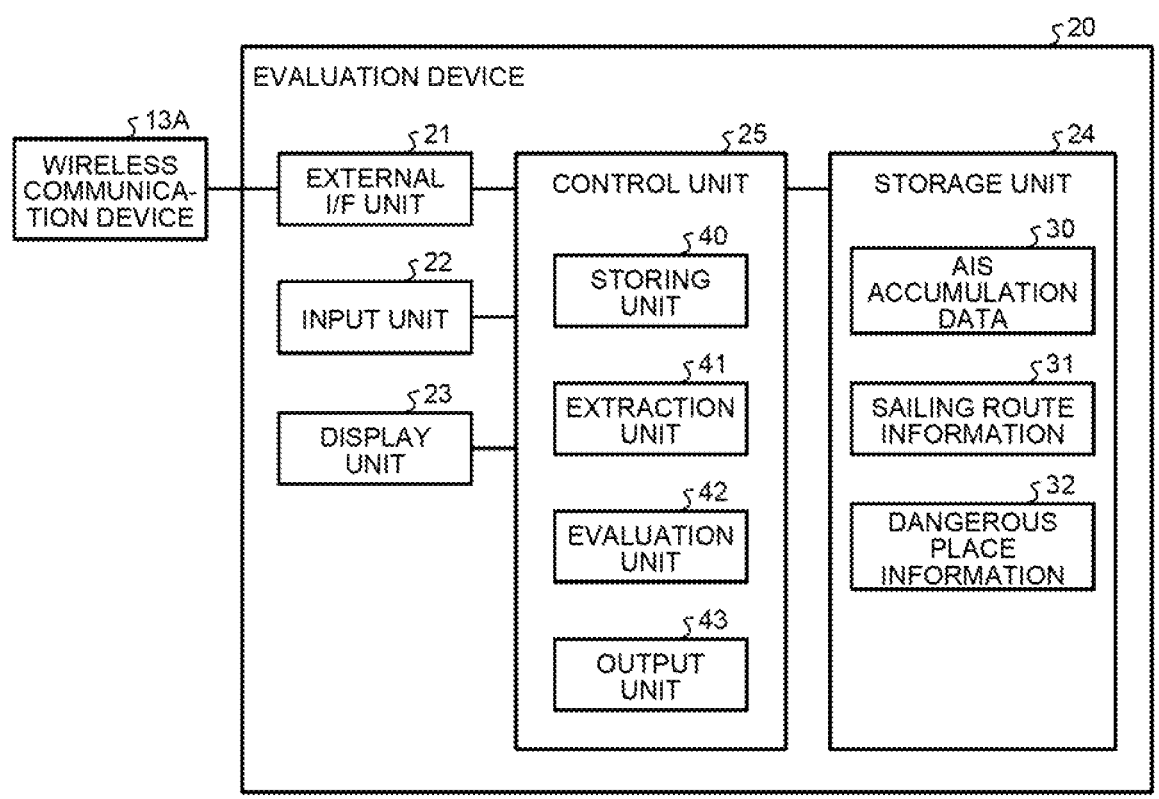
FIG. 2 is a diagram illustrating a general configuration of an evaluation device.

Next, a configuration of an evaluation device 20 according to the first embodiment will be described. FIG. 2 is a diagram illustrating a general configuration of an evaluation device. The evaluation device 20 is a device that is provided for the onshore facility 13 and supports sailing of a ship. For example, the evaluation device 20 is a computer such as a server computer. The evaluation device 20 may be provided as a single computer or may be provided as a plurality of computers. In the present embodiment, a case where the evaluation device 20 is a single computer will be described as an example.

Herein, for example, the Transport Safety Board provides a marine accident hazard map that indicates a position with a marine accident that occurred in a past. However, a dangerous place exists where accident avoidance behavior is found frequently although a marine accident has not occurred. That is, a marine accident hazard map could not have indicated a dangerous place where there is a potential risk although a marine accident has not yet occurred. Accordingly, in the present embodiment, a case where the evaluation device 20 evaluates a risk of collision in a sea area and generates a hazard map that indicates a dangerous place with a high risk of collision will be described as an example.

The evaluation device 20 includes an external interface (I/F) unit 21, an input unit 22, a display unit 23, a storage unit 24, and a control unit 25.

The external I/F unit 21 is, for example, an interface that transmits to or receives from another device, a variety of information. The external I/F unit 21 is capable of wireless communication with each ship 11 through a wireless communication device 13A such as an antenna provided for the onshore facility 13, and transmits to or receives from each ship 11, a variety of information. For example, the external I/F unit 21 receives AIS information from each ship 11 through the wireless communication device 13A.

The input unit 22 is an input device that inputs a variety of information. For the input unit 22, an input device is provided that accepts input of an operation, such as a mouse or a keyboard. The input unit 22 accepts input of a variety of information. For example, the input unit 22 accepts input of an operation for instructing starts of a variety of processes. The input unit 22 inputs operation information that indicates a content of an accepted operation to the control unit 25.

The display unit 23 is a display device that displays a variety of information. For the display unit 23, a display device such as a Liquid Crystal Display (LCD) or a Cathode Ray Tube (CRT) is provided. The display unit 23 displays a variety of information. For example, the display unit 23 displays a variety of screens such as an operation screen.

The storage unit 24 is a storage device such as a hard disk, a Solid State Drive (SSD), or an optical disk. The storage unit 24 may be a data rewritable semiconductor memory such as a Random Access Memory (RAM), a flash memory, or a Non-Volatile Static Random Access Memory (NVS-RAM).

The storage unit 24 stores an Operating System (OS) and a variety of programs that are executed by the control unit 25. For example, the storage unit 24 stores a program for executing an evaluation process as described later. The storage unit 24 further stores a variety of data that are used for a program that is executed by the control unit 25. For example, the storage unit 24 stores AIS accumulation data 30, sailing route information 31, and dangerous place information 32.

The AIS accumulation data 30 are data provided by accumulating AIS information received from each ship 11.

The sailing route information 31 is data including information on a sailing route that exists in a target range that is a target for control of sailing for the onshore facility 13. For example, the sailing route information 31 includes information of a position of a boundary of a region of a sailing route that exists in a target range.

The dangerous place information 32 is data including information on a dangerous place with a high risk of collision.

The control unit 25 is a device that controls the evaluation device 20. For the control unit 25, an electronic circuit such as a Central Processing Unit (CPU) or a Micro Processing Unit (MPU) or an integrated circuit such as an Application Specific Integrated Circuit (ASIC) or a Field Programmable Gate Array (FPGA) can be employed. The control unit 25 includes an internal memory for storing a program that defines steps of a variety of processes, and control data, and thereby, executes the variety of processes. The control unit 25 operates a variety of programs, and thereby, functions as a variety of processing units. For example, the control unit 25 includes a storing unit 40, an extraction unit 41, an evaluation unit 42, and an output unit 43.

The storing unit 40 stores AIS information received from each ship 11 through the wireless communication device 13A as the AIS accumulation data 30.

The extraction unit 41 extracts a dangerous place with a potential risk being present therein, based on the AIS accumulation data 30. For example, the extraction unit 41 detects collision avoidance behavior of a ship based on the AIS accumulation data 30 and extracts a variety of information on a place with the avoidance behavior being detected therein.

Herein, avoidance behavior that is a target in the present embodiment will be described. Avoidance behavior satisfies the following condition 1 and condition 2.

Condition 1: Ship handling action is to reduce a risk of collision.

Condition 2: Ship handling action is to aim at (be intended for) avoidance of collision.

A risk of collision is evaluated based on, for example, a distance of closest approach between two ships in a case where the two ships maintain courses and speeds thereof (Distance of Closest Point of Approach (DCPA))

Herein, it may be impossible to detect avoidance behavior accurately in a case where only a place that satisfies condition 1 is provided. That is, it may be impossible to detect avoidance behavior accurately in a case where a risk of collision is merely reduced.

Figure 3:
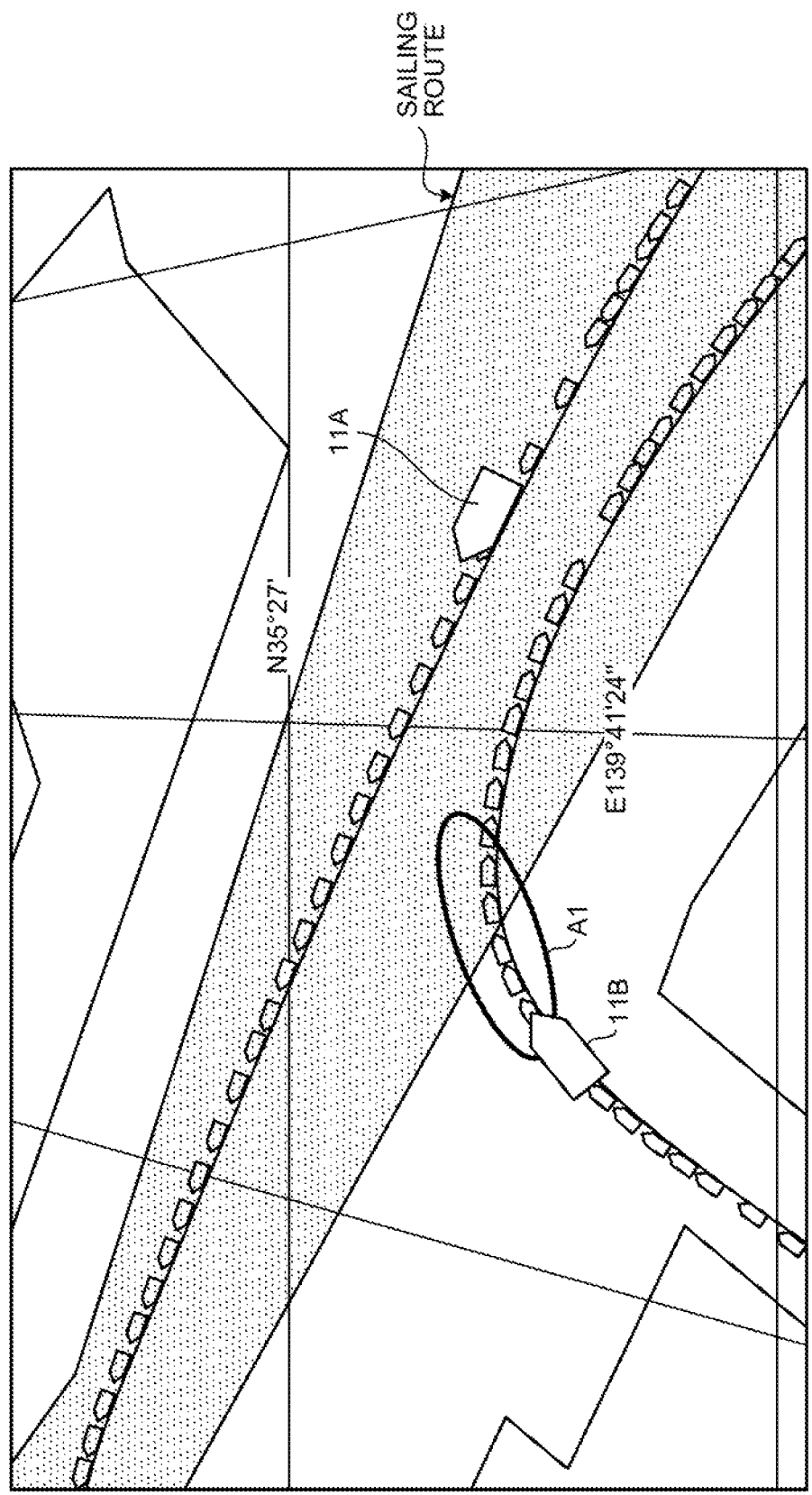
FIG. 3 is a diagram illustrating an example of erroneous detection as avoidance behavior.

FIG. 3 is a diagram illustrating an example of erroneous detection as avoidance behavior. FIG. 3 illustrates ship tracks with two ships 11A and 11B sailing thereon, and a sailing route thereof. Herein, a ship track is a trajectory of a position of a ship. The ship 11A sails along the sailing route. The ship 11B turns a bow thereof to the right in a range A1 to travel into the sailing route. A risk of collision between the ship 11A and the ship 11B is reduced by turning of a bow of the ship 11B to the right as illustrated in the range A1. However, in an example of FIG. 3, it is estimated that turning of a bow of the ship 11B is not turning of a bow that aims at avoidance behavior but is to enter the sailing route.

Figure 4:
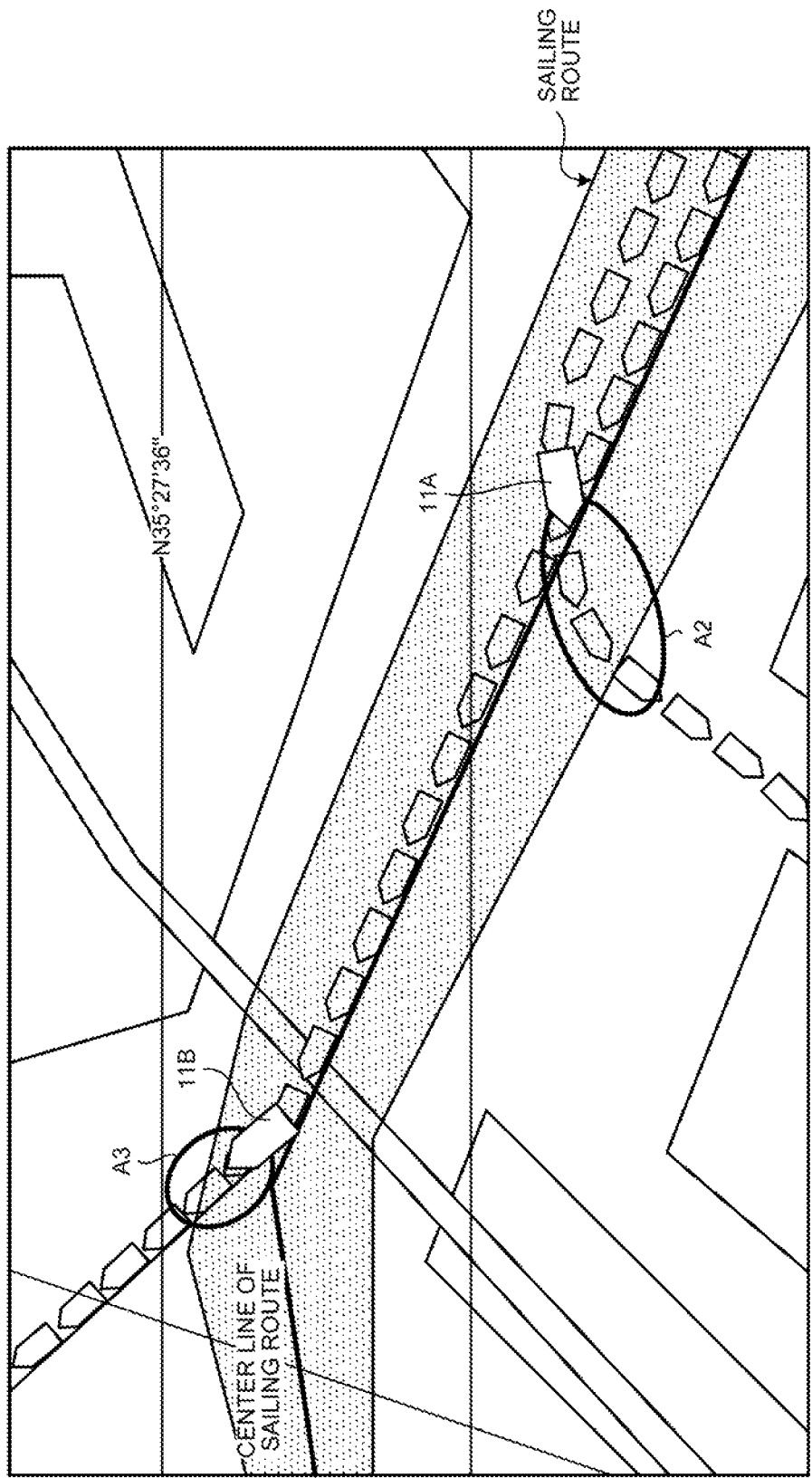
FIG. 4 is a diagram illustrating another example of erroneous detection as avoidance behavior.

FIG. 4 is a diagram illustrating another example of erroneous detection as avoidance behavior. FIG. 4 illustrates ship tracks with two ships 11A and 11B sailing thereon, and a sailing route thereof. The ship 11A sails along the sailing route and turns a bow thereof in a range A2 in middle of the sailing route to change a course thereof to a left wharf. The ship 11B sails along the sailing route and turns a bow thereof in a range A3 n middle of the sailing route to change a course thereof to the right. In such a case, a risk of collision between the ship 11A and the ship 11B is also reduced by turning of a bow of the ship 11A in the range A2 or turning of a bow of the ship 11B in the range A3. However, in an example of FIG. 4, it is estimated that turning of a bow of each of the ship 11A and 11B is not turning of a bow that aims at avoidance behavior but is turning of a bow to go to a destination thereof.

Thus, as only reduction of a risk of collision is a criterion for determination, it may be impossible to detect avoidance behavior accurately.

Hence, the extraction unit 41 detects, in a sea area with a sailing route existing therein, a ship with a distance between two ships being less than a predetermined first threshold and at least one of the two ships having a ship track deviating from the sailing route, and thereby, detects a ship that makes avoidance behavior. For example, the extraction unit 41 acquires, with reference to the sailing route information 31, information on a position of a boundary of a sailing route that exists in a target range that is a target for control of sailing for the onshore facility 13. The extraction unit 41 also acquires positional information that indicates positions of a plurality of ships at each point of time, with reference to the AIS accumulation data 30. Although a case where the AIS accumulation data 30 and the sailing route information 31 are stored in the storage unit 24 of the evaluation device 20 will be described in the present embodiment, the AIS accumulation data 30 and the sailing route information 31 may be stored in an external storage device such as a "storage device". In such a case, the extraction unit 41 acquires, from an external storage device, the sailing route information 31 and positional information that indicates positions of a plurality of ships at each point of time. The extraction unit 41 obtains, for each combination of two ships, a distance between two ships by using the acquired positional information that indicates positions of a plurality of ships at each point of time. For example, the extraction unit 41 obtains a distance between two ships in order of time series, for each combination of two ships, with respect to respective ships that exist at an identical point of time.

The extraction unit 41 extracts a set of two ships that have a possibility of making avoidance behavior. For example, the extraction unit 41 extracts two ships with a distance between the two ships being less than a first threshold, as two ships that have a possibility of making avoidance behavior. The extraction unit 41 may extract two ships with a practical distance at a time of closest approach being less than a first threshold. For each sea area provided by dividing a target range that is a target for control of sailing for the onshore facility 13, a set of two ships may be extracted from a set of ships that exist in an identical sea area, at an identical point of time, for each combination of two ships.

The extraction unit 41 calculates a risk of collision at each point of time from a trajectory (ship track) of a position of each of the extracted two ships at each point of time, and narrows a set of ships to only a set of ships with a risk of collision therebetween being reduced. For example, the extraction unit 41 calculates, as a risk of collision at each point of time, a distance of closest approach (DCPA) between two ships in a case where each of the two ships maintains a course and a speed thereof at each point of time. The extraction unit 41 extracts two ships with a DCPA between the two ships being reduced to a value less than a first threshold and subsequently changed to a value greater than or equal to a predetermined second threshold that is greater than the first threshold.

Figure 5:
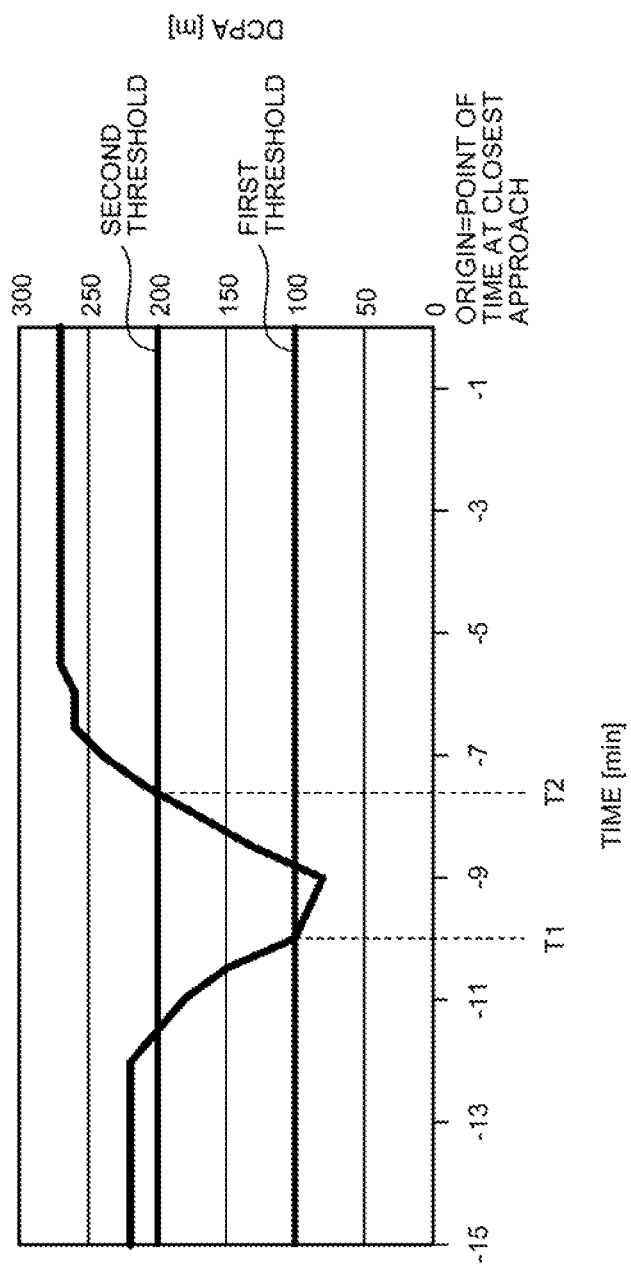
FIG. 5 is a diagram illustrating an example of a change of a DCPA.

FIG. 5 is a diagram illustrating an example of a change of a DCPA. An example of FIG. 5 illustrates a change of a DCPA in a case where each of two ships maintains a course and a speed thereof at each point of time, from a predetermined time before a point of time when the two ships are practically provided at a distance of closest approach therebetween. The extraction unit 41 extracts two ships with a DCPA between the two ships being reduced to a value less than a first threshold and subsequently changed to a value greater than or equal to a predetermined second threshold that is greater than the first threshold. A first threshold is, for example, 100 m, and a second threshold is, for example, 200 m, while they are not limited thereto. A first threshold and a second threshold may be changeable externally. For example, a screen for setting a first threshold and a second threshold may be displayed on the display unit 23 to be changeable by input from the input unit 22. A first threshold and a second threshold may be changed depending on kinds or sizes of two ships. For example, in a case where one of two ships is a ship with a package with a high risk being loaded thereon, a first threshold and a second threshold may be changed to large values. Whether a package has a high risk can be determined from, for example, sailing-related information that is included in AIS information.

For example, as a length of a ship is increased, a first threshold and a second threshold may be changed to larger values.

The extraction unit 41 extracts two ships with a DCPA between the two ships being reduced to a value less than a first threshold and subsequently the DCPA between the two ships being changed to a value greater than or equal to a second threshold. The extraction unit 41 also identifies a point of time T1 when a DCPA between two ships are reduced to a value less than a first threshold and a point of time T2 when the DCPA between the two ships is changed to a value greater than or equal to a second threshold.

The extraction unit 41 determines which of the extracted two ships is provided on a sailing route thereof during a period of time between the point of time T1 and the point of time T2 for each of the two ships. In a case where one of two ships is provided on a sailing route thereof during a period of time between the point of time T1 and the point of time T2, the extraction unit 41 determines whether or not at least one of the two ships sails in a direction deviating from the sailing route during the period of time between the point of time T1 and the point of time T2. For example, in a case where at least one of two ships has a ship track that departs from a center line of a sailing route thereof during a period of time between the point of time T1 and the point of time T2, the extraction unit 41 determines that sailing is executed in a direction deviating from the sailing route. A ship track that departs from a center line may be determined based on a distance between the center line and a ship. Alternatively, a ship track that departs from a center line may be determined based on an angle between the center line and a traveling direction of a ship. For example, the extraction unit 41 obtains an angle of a course of at least one ship among two ships with respect to a center line of a sailing route thereof at predetermined first timing during a period of time between the point of time T1 and the point of time T2. The extraction unit 41 also obtains an angle of the one ship with respect to a center line of a sailing route thereof at predetermined second timing before a period of time between the point of time T1 and the point of time T2. In a case where an angle at first timing is greater than an angle at second timing and greater than or equal to a threshold, the extraction unit 41 determines that sailing is executed in a direction deviating from a sailing route. Such first timing may be the point of time T1, may be the point of time T2, or may be a point of time when a DCPA is smallest. Such second timing is, for example, 5 minutes before the point of time T1, is not limited thereto, and may be any point of time that can be regarded as timing before a ship changes a course thereof. Such second timing may be, for example, a point of time when a DCPA between two ships just near the point of time T1 is changed to a second threshold.

Figure 6:
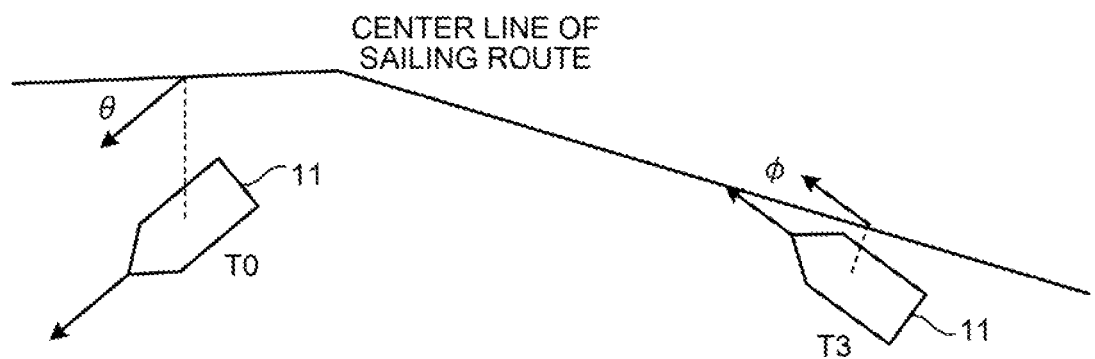
FIG. 6 is a diagram illustrating an example of an angel of a course of a ship with respect to a center line of a sailing route thereof.

FIG. 6 is a diagram illustrating an example of an angle of a course of a ship with respect to a center line of a sailing route thereof. FIG. 6 illustrates a course of a ship 11 at a point of time T0 that is first timing during a period of time between the point of time T1 and the point of time T2, and an angle θ thereof with respect to a center line of a sailing route at a nearest point on the center line of a sailing route. FIG. 6 also illustrates a course of the ship 11 at a point of time T3 that is second timing before a predetermined time (for example, 5 minutes) before a period of time between the point of time T1 and the point of time T2, and an angle Φ thereof with respect to a center line of a sailing route at a nearest point on the center line of a sailing route. In a case where the angle θ is greater than the angle Φ and the angle θ is greater than or equal to a threshold Th, the extraction unit 41 determines that the ship 11 sails in a direction deviating from a sailing route thereof. Such a threshold Th is determined as a value such that a ship is regarded as traveling on a sailing route thereof. The threshold Th is, for example, 5 degrees. In an example of FIG. 6, the angle θ is greater than the angle Φ and the angle θ is greater than or equal to 5 degrees, so that sailing in a direction deviating from a sailing route is determined.

Figure 7:
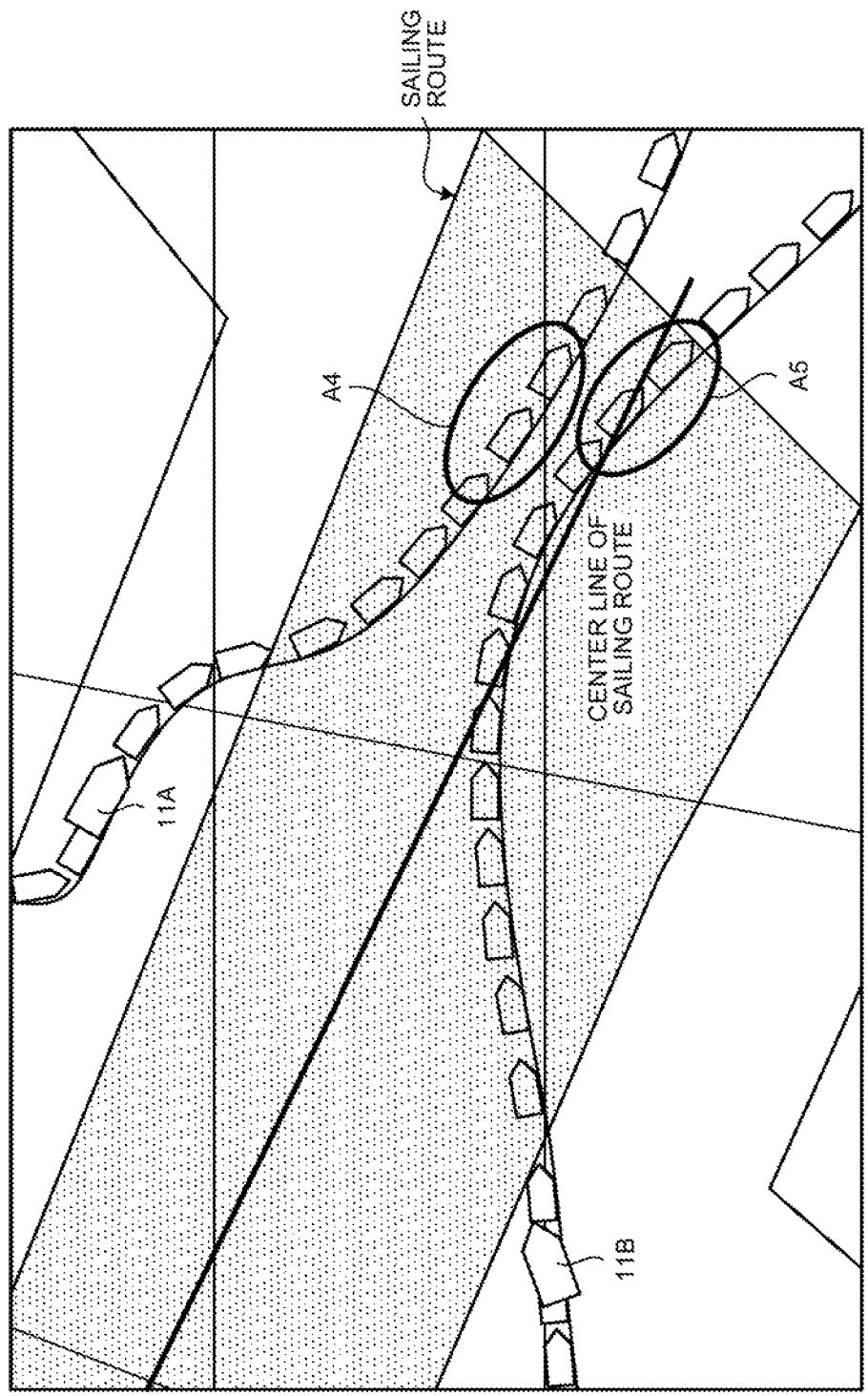
FIG. 7 is a diagram illustrating an example of detection as avoidance behavior.

The extraction unit 41 detects a ship determined to sail in a direction deviating from a sailing route thereof, as a ship that makes avoidance behavior. FIG. 7 is a diagram illustrating an example of detection as avoidance behavior. FIG. 7 illustrates ship tracks with two ships 11A and 11B sailing thereon, and a sailing route thereof. The ship 11A travels into the sailing route from an upper side so as to approach the ship 11B, and hence, turns a bow thereof to the left in a range A4. The ship 11B travels into the sailing route from a lower side so as to approach the ship 11A, and hence, turns a bow thereof to the right in a range A5. A DCPA between the ships 11A and 11B is reduced by turning of bows of the ships 11A and 11B with a risk of collision being increased by approaching thereof, and ship tracks thereof are caused to depart from a center line of the sailing route by turning of the bow of the ship 11A to the left as illustrated in the range A4, so that sailing in a direction deviating from the sailing route is determined.

Figure 8:
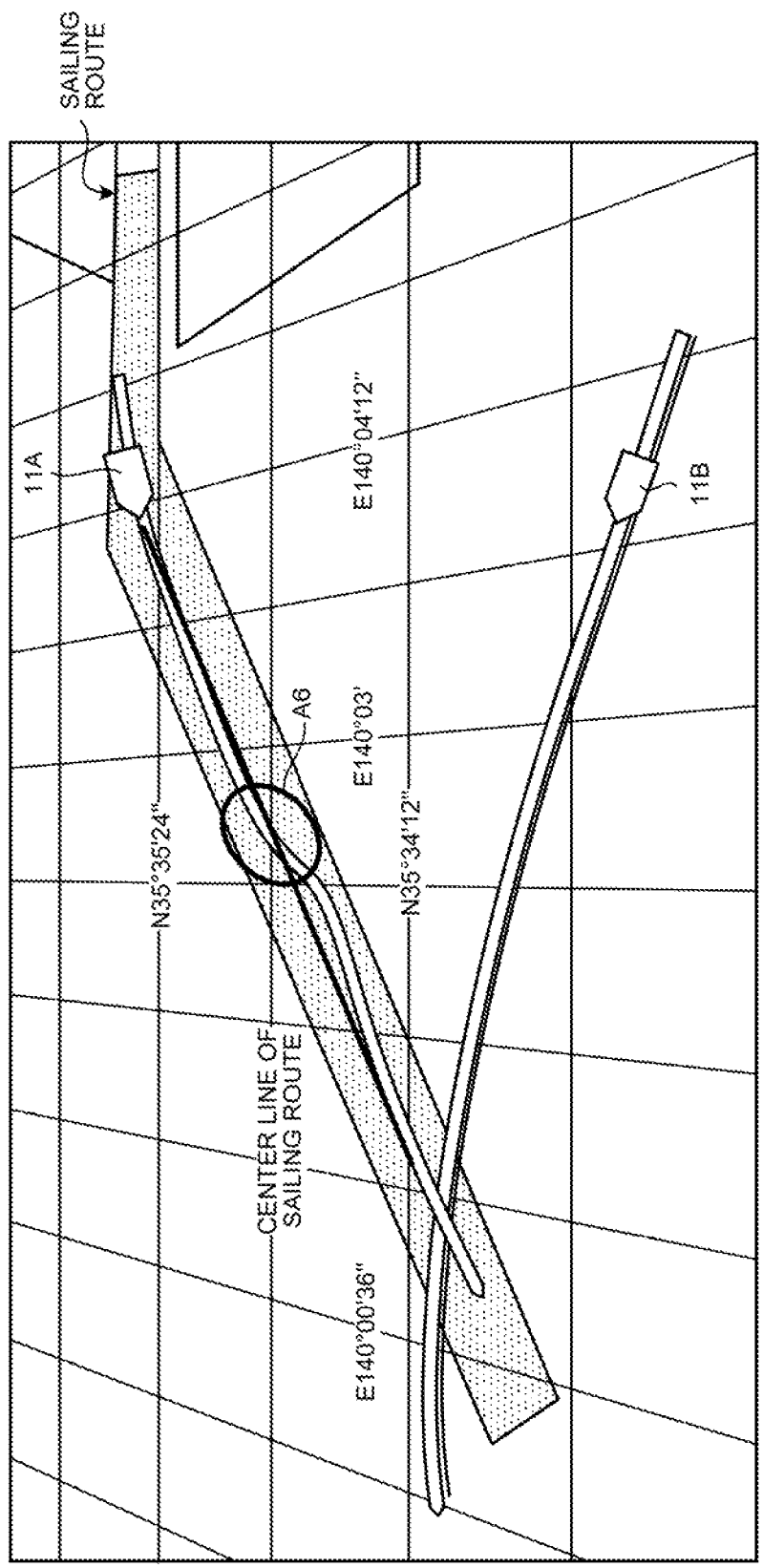
FIG. 8 is a diagram illustrating another example of detection as avoidance behavior.

FIG. 8 is a diagram illustrating another example of detection as avoidance behavior. FIG. 8 illustrates ship tracks with two ships 11A and 11B sailing thereon, and a sailing route thereof. The ship 11A sails along the sailing route and snakes in a range A6 on the sailing route. The ship 11B crosses the sailing route from a right side. A DCPA between the ships 11A and 11B is reduced by snaking of the ship 11A in the range A6 with a risk of collision being increased by approaching thereof, and ship tracks thereof are caused to depart from a center line of the sailing route by turning of the bow of the ship 11A at a time of snaking thereof as illustrated in the range A6, so that sailing in a direction deviating from the sailing route is determined.

The extraction unit 41 extracts a sailing log of a ship that makes avoidance behavior. For example, the extraction unit 41 extracts, from the AIS accumulation data 30, a point of time when avoidance behavior is made and a position of a ship that makes the avoidance behavior.

The evaluation unit 42 evaluates risks at a plurality of points in a sea area based on the extracted sailing log. For example, the evaluation unit 42 counts, for a certain range of a sea area, the number of times that a ship that makes avoidance behavior is detected. The evaluation unit 42 stores, for each dangerous place, a position of a dangerous place and a variety of information such as information on a ship that makes avoidance behavior, as the dangerous place information 32, provided that such a dangerous place with a high risk of collision is a range where the ship that makes avoidance behavior is detected by a predetermined number of times or more. A method for evaluating a risk is an example and this is not limiting. For example, the evaluation unit 42 may store all positions where a ship that makes avoidance behavior is detected, as dangerous places in the dangerous place information 32.

The output unit 43 executes a variety of output. For example, the output unit 43 generates data of a hazard map where a position of a dangerous place with a high risk of collision that is stored as the dangerous place information 32 is plotted on a sea area, and outputs the hazard map to a screen or an external device. Thereby, a dangerous place can be identified.

Flow of Process

Figure 9:
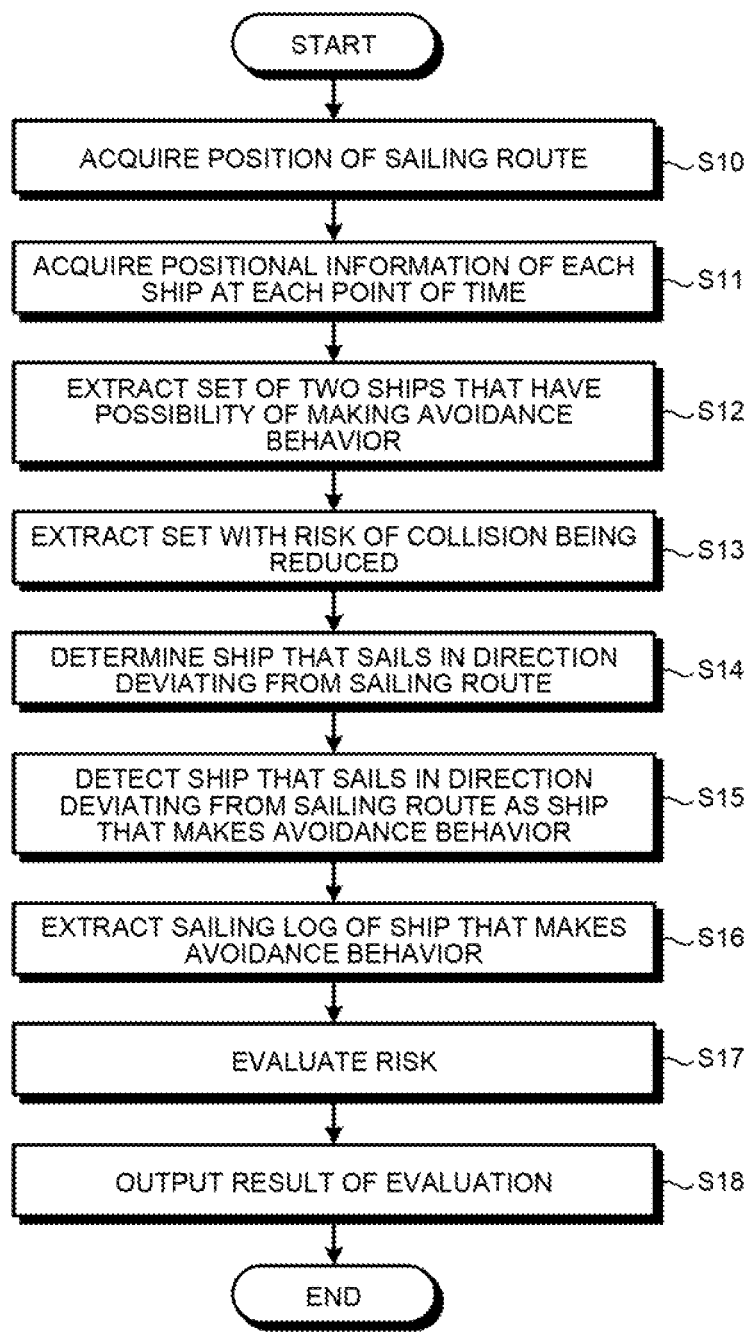
FIG. 9 is a flowchart illustrating an example of steps of an evaluation process.

Next, a flow of an evaluation process of the evaluation device 20 according to the present embodiment to evaluate a dangerous place with a high risk of collision will be described. FIG. 9 is a flowchart illustrating an example of steps of an evaluation process. Such an evaluation process is executed at predetermined timing, for example, timing when a predetermined operation for instructing a start of the process is accepted.

As illustrated in FIG. 9, the extraction unit 41 acquires, with reference to the sailing route information 31, information of a position of a boundary of a sailing route that exists in a target range that is a target for control of sailing for the onshore facility 13 (S10). The extraction unit 41 acquires positional information that indicates positions of a plurality of ships for each point of time, with reference to the AIS accumulation data 30 (S11).

The extraction unit 41 extracts a set of two ships that have a possibility of making avoidance behavior (S12). For example, the extraction unit 41 extracts two ships with a DCPA between the two ships being less than a first threshold, as two ships that have a possibility of making avoidance behavior.

The extraction unit 41 calculates a risk of collision at each point of time from a ship track at a position of each of the extracted two ships at each point of time, and narrows a set of ships to only a set of ships with a risk of collision being reduced (S13). For example, the extraction unit 41 calculates a DCPA between two ships at each point of time as a risk of collision at each point of time. Then, the extraction unit 41 extracts two ships with a DCPA between the two ships being reduced to a value less than a first threshold and subsequently the DCPA between the two ships being changed to a value greater than or equal to a second threshold.

The extraction unit 41 determines a ship that sails in a direction deviating from a sailing route thereof, from each of the extracted two ships (S14). For example, the extraction unit 41 identifies a point of time T1 when a DCPA between two ships is reduced to a value less than a first threshold and a point of time T2 when the DCPA between the two ships is changed to a value greater than or equal to a second threshold. In a case where there is a ship track with at least one of the two ships departing from a center line of a sailing route thereof during a period of time between the point of time T1 and the point of time T2, the extraction unit 41 determines that sailing is executed in a direction deviating from the sailing route.

The extraction unit 41 detects a ship determined to sail in a direction deviating from a sailing route thereof, as a ship that makes avoidance behavior (S15). The extraction unit 41 extracts a sailing log of a ship that makes avoidance behavior (S16). For example, the extraction unit 41 extracts, from the AIS accumulation data 30, points of time when avoidance behavior is made and positions of two ships.

The evaluation unit 42 evaluates risks at a plurality of points in a sea area based on the extracted sailing log (S17). For example, the evaluation unit 42 counts the number of times that a ship that makes avoidance behavior is detected, for a certain range of a sea area. Then, the evaluation unit 42 stores, for each dangerous place, a position of a dangerous place, and a variety of information such as information of a ship that makes avoidance behavior, as the dangerous place information 32, provided that such a dangerous place with a high risk of collision is a range where a ship that makes avoidance behavior is detected by a predetermined number of times or more.

The output unit 43 outputs a result of evaluation (S18) and ends the process. For example, the output unit 43 generates data of a hazard map where a position of a dangerous place with a high risk of collision that is stored as the dangerous place information 32 is plotted in a sea area, and outputs the hazard map to a screen.

Advantageous Effect

The evaluation device 20 according to the present embodiment extracts a sailing log of a ship in a sea area with a sailing route existing therein, wherein the sea area is such that a distance between two ships is less than a predetermined value (first threshold) and at least one of the two ships has a ship track deviating from the sailing route. The evaluation device 20 evaluates risks at a plurality of points that are included in the sea area, based on the extracted sailing log. Thereby, the evaluation device 20 can accurately detect a dangerous place with a high risk of collision.

Furthermore, the evaluation device 20 according to the present embodiment determines, as the ship track deviating from the sailing route, a ship track with the at least one of the two ships departing from a center line of the sailing route during a period of time when a distance of closest approach between the two ships is reduced to a value less than the predetermined value and subsequently changed to a value greater than or equal to a predetermined second value (second threshold) that is greater than the predetermined value in a case where the two ships maintain courses and speeds thereof. Thereby, the evaluation device 20 can accurately detect a ship track that deviates from a sailing route by ship handling action aiming at avoidance of collision.

Furthermore, the evaluation device 20 according to the present embodiment determines, as the ship track deviating from the sailing route, a ship track with an angle of a course of at least one ship among the two ships with respect to a center line of the sailing route at predetermined first timing during a period of time when a distance of closest approach (DCPA) between the two ships is reduced to a value less than the predetermined value and subsequently changed to a value greater than or equal to a predetermined second value greater than the predetermined value in a case where the two ships maintain courses and speeds thereof being greater than an angle of a course of the one ship with respect to the center line of the sailing route at predetermined second timing before the period of time and being greater than or equal to a predetermined threshold. Thereby, the evaluation device 20 can accurately detect a ship track that deviates from a sailing route by ship handling action aiming at avoidance of collision.

Although the embodiment for a disclosed device has been described above, a disclosed technique may be implemented in a variety of different modes as well as the embodiment described above. Hereinafter, other embodiments that are included in the present invention will be described.

For example, although a case where a distance of closest approach (DCPA) between two ships in a case where the two ships maintain courses and speeds thereof is calculated as a risk of collision therebetween has been described as an example in the embodiment described above, a disclosed device is not limited thereto. A DCPA may be calculated as follows. For example, a DCPA may be calculated, provided that a ship that sails on a sailing route thereof, among two ships, sails along the sailing route. For example, in a case where a ship among two ships is positioned on a sailing route thereof and an angle between a course thereof and a center line of the sailing route is less than or equal to a threshold Th, the extraction unit 41 may expect a position of sailing along the sailing route while a distance between the center line of the sailing route and the ship is retained, and thereby, calculate a DCPA between the two ships. Thereby, the evaluation device 20 can calculate a risk of collision in a case where a ship sails along a sailing route thereof, even in a case where a direction of the sailing route is changed.

Figure 10:
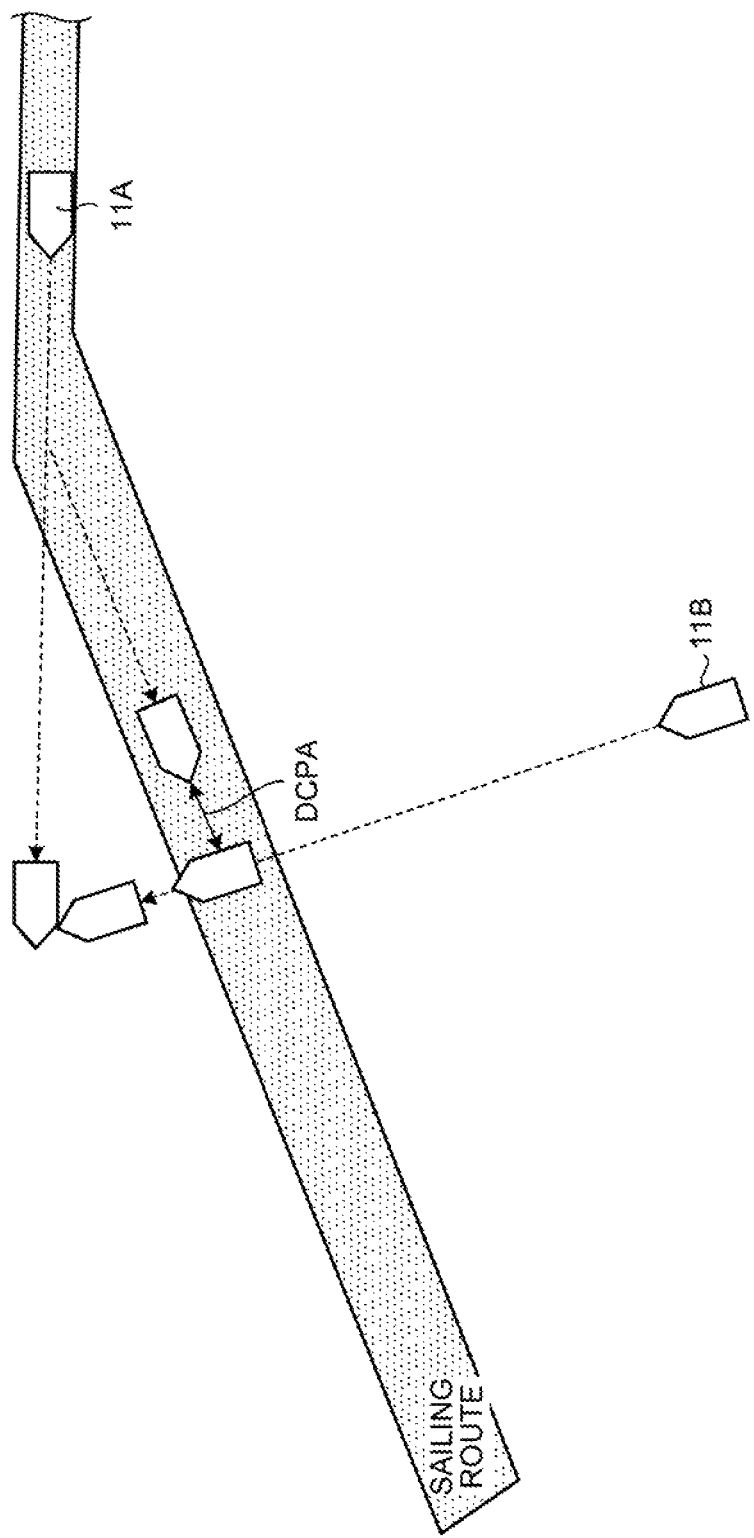
FIG. 10 is a diagram illustrating an example of calculation of a DCPA provided that a ship sails along a sailing route thereof.

FIG. 10 is a diagram illustrating an example of calculation of a DCPA provided that a ship sails along a sailing route thereof. FIG. 10 illustrates ship tracks with two ships 11A and 11B sailing thereon, and a sailing route thereof. The ship 11A sails along the sailing route. A direction of the sailing route is changed in front of the ship 11A. The ship 11B crosses the sailing route in front of the ship 11A. In such a case, the extraction unit 41 may expect a position where the ship 11A sails along the sailing route while a distance between the center line of the sailing route and the ship is retained, and thereby, calculate a DCPA between the ships 11A and 11B.

Figure 11:
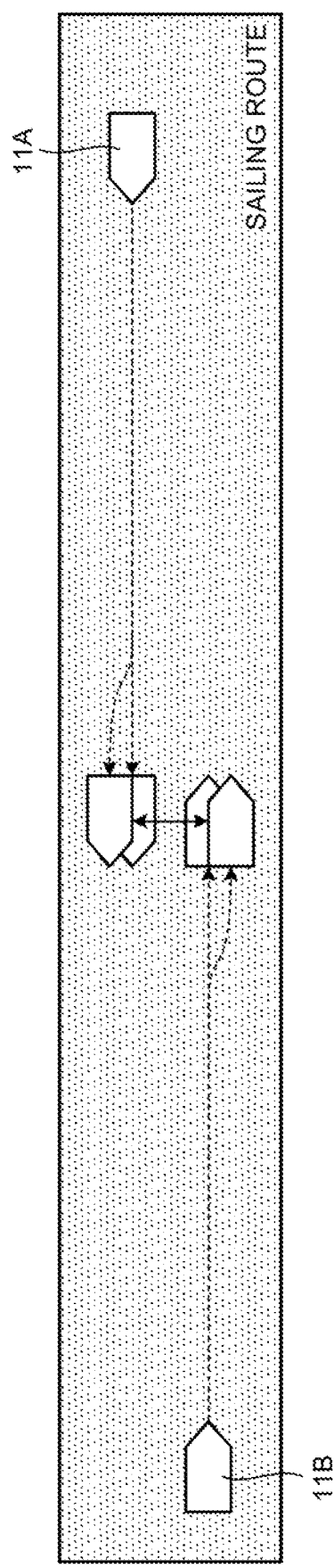
FIG. 11 is a diagram illustrating an example of avoidance behavior of a ship.
Figure 12:
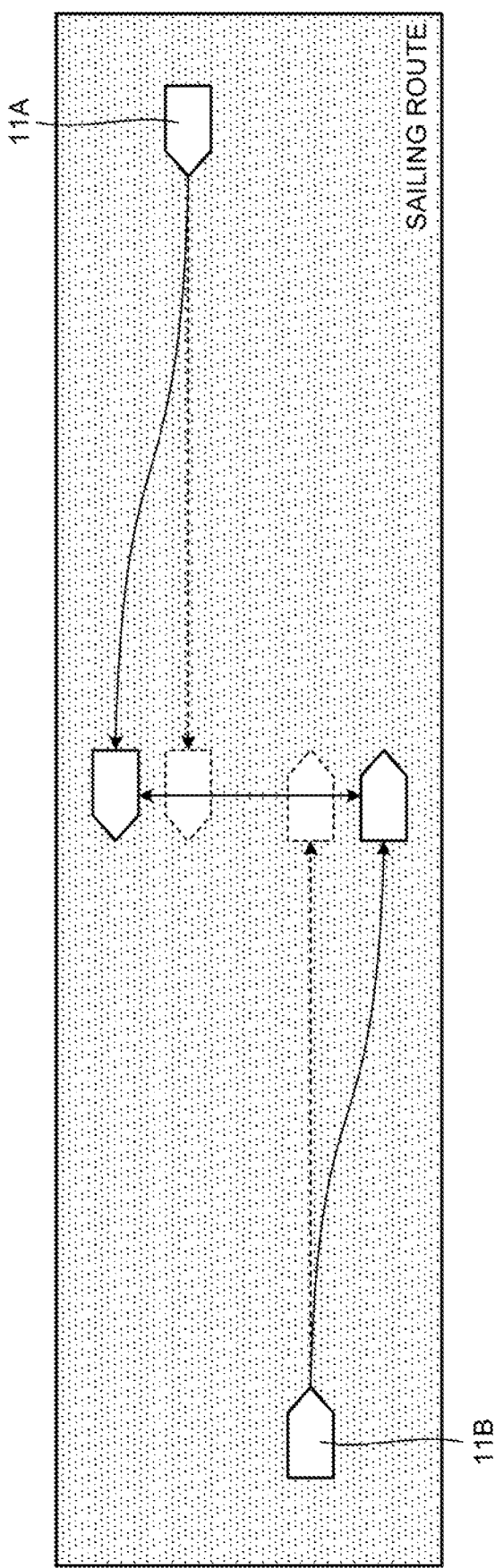
FIG. 12 is a diagram illustrating an example of avoidance behavior of a ship.

Meanwhile, a sailing route is such that a width thereof is small in a narrow sea area and the width is large in a broad sea area. Avoidance behavior of a ship is different depending on a width of a sailing route thereof. FIG. 11 and FIG. 12 are diagrams illustrating an example of avoidance behavior of a ship. FIG. 11 and FIG. 12 illustrate ship tracks with two ships 11A and 11B sailing thereon, and sailing routes thereof. FIG. 11 illustrates avoidance behavior in a case where a width of a sailing route is small. FIG. 12 illustrates avoidance behavior in a case where a width of a sailing route is large. As illustrated in FIG. 11, in a case where a width of a sailing route is small, the ships 11A and 11B are preferentially along the sailing route, and hence, make small-scale avoidance behavior. On the other hand, as illustrated in FIG. 12, in a case where a width of a sailing route is large, the ships 11A and 11B can make avoidance behavior without deviating from the sailing route, and hence, make large-scale avoidance behavior.

Accordingly, the extraction unit 41 may change a first threshold and a second threshold depending on a width of a sailing route. For example, in a case where one of two ships is positioned on a sailing route thereof, the extraction unit 41 obtains a width of a sailing route with a ship being positioned thereon. In a case where both of two ships are positioned on sailing routes thereof, a width of a sailing route with the width being smaller is obtained among sailing routes with the two ships being positioned thereon. The extraction unit 41 may greatly change a first threshold and a second threshold as a width of a sailing route is increased, and thereby, detect a ship that has a ship track deviating from the sailing route. Thereby, the evaluation device 20 can accurately detect a ship that makes avoidance behavior, depending on a width of a sailing route.

A speed limit is provided on a sailing route. However, there are a lot of accelerating ships near a terminal of a sailing route. A DCPA is a distance of closest approach in a case where a speed is maintained, and there is a high possibility of increasing a difference from a distance of closest approach that is practically provided near a terminal of a sailing route.

The extraction unit 41 may change a first threshold and a second threshold depending on whether a position of a ship is provided near a terminal of a sailing route thereof. For example, the extraction unit 41 may greatly change a first threshold and a second threshold as a position of a ship is provided near a terminal of a sailing route, and thereby, detect a ship that has a ship track deviating from the sailing route. Thereby, the evaluation device 20 can accurately detect avoidance behavior of a ship that sails on a portion of a sailing route near a terminal thereof.

Figure 13:
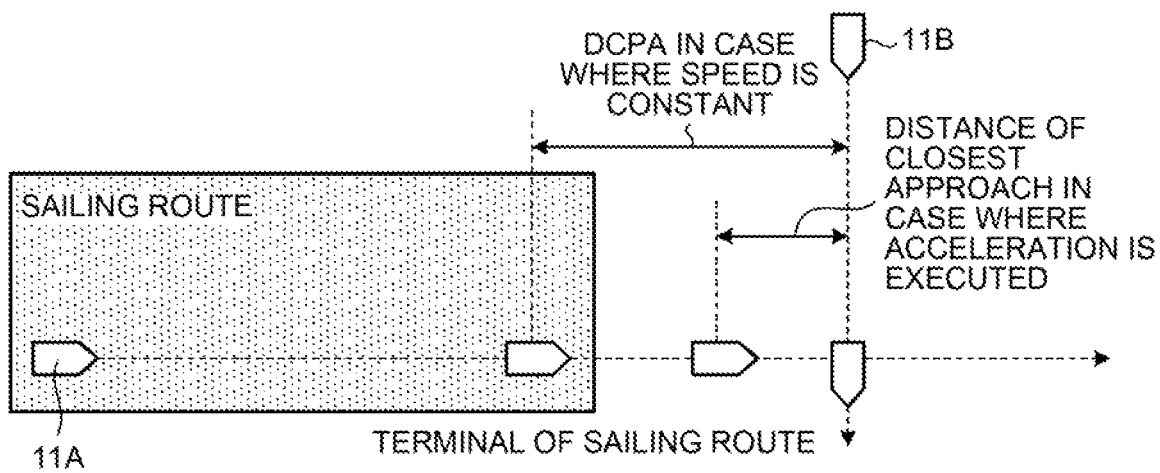
FIG. 13 is a diagram illustrating an example of a DCPA between ships that sail near a terminal of a sailing route thereof.

FIG. 13 is a diagram illustrating an example of a DCPA between ships that sail near a terminal of a sailing route thereof. FIG. 13 illustrates ship tracks with two ships 11A and 11B sailing thereon, and a sailing route thereof. The ship 11A snakes near a terminal of the sailing route and increases a speed thereof. The ship 11B crosses the sailing route in front of the ship 11A. A DCPA is a distance of closest approach in a case where a speed is maintained, and there is a high possibility of increasing a difference from a distance of closest approach that is practically provided near the terminal of the sailing route. Even in such a case, the extraction unit 41 greatly changes a first threshold and a second threshold as a position of a ship is provided near the terminal of the sailing route, and detects a ship that has a ship track deviating from the sailing route. The evaluation device 20 can accurately detect avoidance behavior even in a case where the ship 11A increases a speed thereof near the terminal of the sailing route.

Each component of each device as illustrated in the drawings is functionally conceptual and need not be physically configured as illustrated in the drawings. That is, a specific state of separation or integration of respective devices is not limited to that illustrated in the drawings, and all or a part thereof can be configured to be functionally or physically separated or integrated in an arbitrary unit depending on a variety of loads, usage, or the like. For example, respective processing units that are the storing unit 40, the extraction unit 41, the evaluation unit 42, and the output unit 43 may be integrated or separated appropriately. For example, a processing function of the extraction unit 41 may be divided into those of a plurality of processing units to realize the processing function. All or any part of respective processing functions that are executed in respective processing units can be realized by a CPU and a program that is analyzed and executed in the CPU or realized by hardware based on a wired logic.

Evaluation Program

Figure 14:
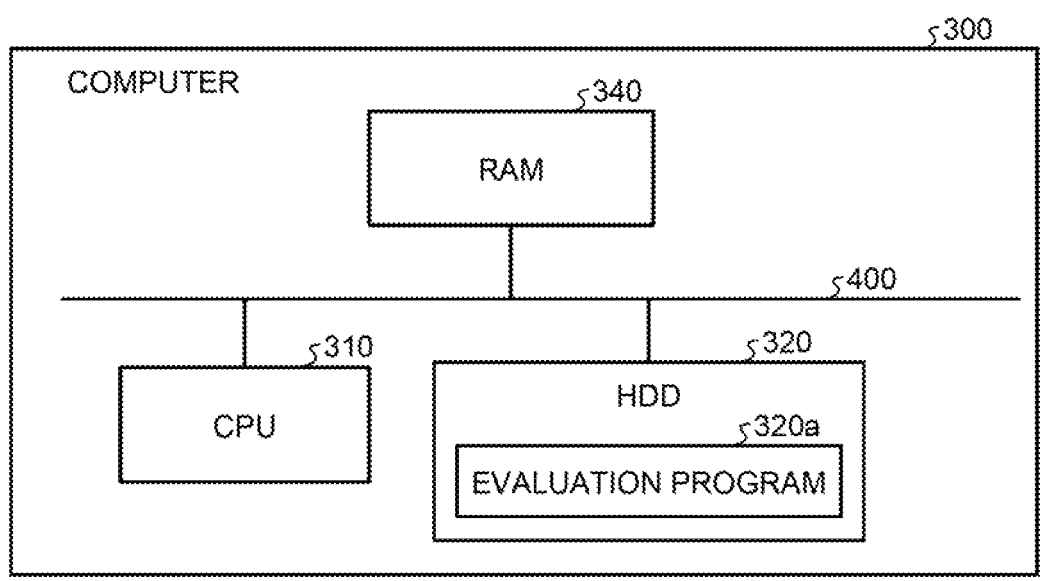
FIG. 14 is a diagram illustrating a computer that executes an evaluation program.

A variety of processes as described in the embodiment as described above can also be realized by executing a preliminarily prepared program in a computer system such as a personal computer or a workstation. Hereinafter, an example of a computer system will be described that executes a program that has a function similar to that of the embodiment as described above. FIG. 14 is a diagram illustrating a computer that executes an evaluation program.

As illustrated in FIG. 14, a computer 300 includes a CPU 310, a Hard Disk Drive (HDD) 320, and a Random Access Memory (RAM) 340. Respective units 310 to 340 are connected to one another through a bus 400.

An evaluation program 320a that fulfills a function similar to that of each processing unit in the embodiment as described above is preliminarily stored in the HDD 320. For example, the evaluation program 320a is stored that fulfills functions similar to those of the storing unit 40, the extraction unit 41, the evaluation unit 42, and the output unit 43 in the embodiment as described above. The evaluation program 320a may be divided appropriately.

The HDD 320 stores a variety of data. For example, the HDD 320 stores an OS and a variety of data.

The CPU 310 reads from the HDD 320 and executes the evaluation program 320a, and thereby executes an operation similar to that of each processing unit in the embodiment. That is, the evaluation program 320a executes operations similar to those of the storing unit 40, the extraction unit 41, the evaluation unit 42, and the output unit 43 in the embodiment.

The evaluation program 320a as described above need not be stored in the HDD 320 from a start. For example, a program is stored in a "portable physical medium" that is inserted into the computer 300, such as a flexible disk (FD), a Compact Disk Read Only Memory (CD-ROM), a Digital Versatile Disk (DVD), a magneto optical disk, or an IC card. The computer 300 may read therefrom and execute a program.

A program is stored in "another computer (or server)" or the like that is connected to the computer 300 through a public line, the internet, a LAN, a WAN, or the like. The computer 300 may read therefrom and execute a program.

According to an embodiment of the present invention, an advantageous effect is provided such that a dangerous place with a high risk of collision can be detected accurately.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program that causes a computer to execute a process comprising:

extracting a sailing log of a ship in a sea area with a sailing route existing therein, the sea area being such that a distance of closest approach between two ships in a case where the two ships maintain courses and speeds thereof is less than a predetermined value and at least one of the two ships has a ship track deviating from the sailing route;

evaluating risks at a point of maneuvering behavior for collision avoidance that are included in the sea area, based on the extracted sailing log; and outputting the point of maneuvering behavior for collision avoidance.

2. The non-transitory computer-readable recording medium according to claim 1, wherein the extracting includes:

determining, as the ship track deviating from the sailing route, a ship track with the at least one of the two ships departing from a center line of the sailing route during a period of time when a distance of closest approach between the two ships is reduced to a value less than the predetermined value and subsequently changed to a value greater than or equal to a predetermined second value that is greater than the predetermined value in a case where the two ships maintain courses and speeds thereof.

3. The non-transitory computer-readable recording medium according to claim 1, wherein the extracting includes:

determining, as the ship track deviating from the sailing route, a ship track with an angle of a course of at least one ship among the two ships with respect to a center line of the sailing route at predetermined first timing during a period of time when a distance of closest approach between the two ships is reduced to a value less than the predetermined value and subsequently changed to a value greater than or equal to a predetermined second value that is greater than the predetermined value in a case where the two ships maintain courses and speeds thereof being greater than an angle of a course of the one ship with respect to the center line of the sailing route at predetermined second timing before the period of time and being greater than or equal to a predetermined threshold.

4. The non-transitory computer-readable recording medium according to claims 1, wherein the extracting includes:

calculating the distance between the two ships, provided that a ship sailing on the sailing route among the two ships sails along the sailing route.

5. The non-transitory computer-readable recording medium according to claim 1, wherein the program causes a computer to execute a process comprising:

changing the predetermined value to a smaller value as increasing a width of the sailing route is increased or a terminal of the sailing route is approached.

6. An evaluation method comprising:

extracting, by a processor, a sailing log of a ship in a sea area with a sailing route existing therein, the sea area being such that a distance of closest approach between two ships in a case where the two ships maintain courses and speeds thereof is less than a predetermined value and at least one of the two ships has a ship track deviating from the sailing route;

evaluating, by the processor, risks at a point of maneuvering behavior for collision avoidance that are included in the sea area, based on the extracted sailing log; and outputting the point of maneuvering behavior for collision avoidance.

7. An evaluation device comprising:

a processor that executes a process, the process comprising:

extracting a sailing log of a ship in a sea area with a sailing route existing therein, the sea area being such that a distance of closest approach between two ships in a case where the two ships maintain courses and speeds thereof is less than a predetermined value and at least one of the two ships has a ship track deviating from the sailing route;

evaluating risks at a point of maneuvering behavior for collision avoidance that are included in the sea area, based on the extracted sailing log; and outputting the point of maneuvering behavior for collision avoidance.

* * * * *